United States Patent [19]
Ichikawa et al.

[11] Patent Number: 6,123,628
[45] Date of Patent: Sep. 26, 2000

[54] SOLID GOLF BALLS AND METHOD OF MAKING

[75] Inventors: Yasushi Ichikawa; Shunichi Kashiwagi; Rinya Takesue, all of Chichibu; Nobuhiko Matsumura; Kunitoshi Ishihara, both of Izumiohtsu, all of Japan

[73] Assignee: Bridgestone Sports Co., Ltd., Tokyo, Japan

[21] Appl. No.: 09/211,055

[22] Filed: Dec. 15, 1998

[30] Foreign Application Priority Data

Dec. 17, 1997 [JP] Japan .................................. 9-364154

[51] Int. Cl.$^7$ .............................. A63B 37/06; A63B 39/00
[52] U.S. Cl. .......................... 473/371; 473/361; 473/363; 473/365; 473/374; 473/377; 473/378; 156/146
[58] Field of Search ..................................... 473/361, 371, 473/365, 377, 378, 363, 374; 156/146

[56] References Cited

U.S. PATENT DOCUMENTS

| | | | |
|---|---|---|---|
| 4,748,194 | 5/1988 | Geeck | 523/427 |
| 5,019,319 | 5/1991 | Nakamura et al. | 273/218 |
| 5,334,673 | 8/1994 | Wu | 273/235 |
| 5,356,149 | 10/1994 | Kane | 273/218 |
| 5,589,546 | 12/1996 | Hiraoka et al. | 525/193 |
| 5,674,137 | 10/1997 | Maruko et al. | 473/354 |
| 5,721,304 | 2/1998 | Pasque, Jr. | 524/433 |
| 5,744,549 | 4/1998 | Lutz | 525/129 |
| 5,779,562 | 7/1998 | Melvin et al. | 473/373 |
| 5,792,803 | 8/1998 | Savin | 523/219 |
| 5,800,286 | 9/1998 | Kakiuchi et al. | 473/365 |
| 5,803,831 | 9/1998 | Sullivan et al. | 473/374 |
| 5,833,553 | 11/1998 | Sullivan et al. | 473/374 |

*Primary Examiner*—Stephen F. Gerrity
*Assistant Examiner*—Paul D. Kim
*Attorney, Agent, or Firm*—Sughrue, Mion, Zinn, Macpeak & Seas, PLLC

[57] ABSTRACT

A solid golf ball has a solid core and a cover formed of a resin composition comprising the reaction product of a thermoplastic polyurethane elastomer with an isocyanate compound. The ball is efficiently moldable and meets such requirements as a pleasant feel, ease of control, high resilience, and minimized scuffs by iron shots.

8 Claims, No Drawings

SOLID GOLF BALLS AND METHOD OF MAKING

This invention relates to solid golf balls comprising a core and a cover which are efficiently moldable and meet such requirements as a pleasant feel, ease of control, high resilience, and minimized scuffs by iron shots.

BACKGROUND OF THE INVENTION

Professional and skilled golfers favor golf balls using balata rubber as the cover stock because the balata cover offers a soft feel, a desired spin rate and control upon iron shots.

The golf balls using balata rubber, however, are rather difficult to mold and require an increased material cost and manufacturing cost. Because of low resilience, balata rubber is believed unsuitable for combination with solid cores. Another problem of the balata cover balls is that upon iron shots, the cover surface is scraped off by grooves across the iron clubface owing to the frictional force between the clubface and the cover, so that the ball surface is marred or fluffed.

Ionomer resin covers have been proposed. Sullivan, U.S. Pat. No. 4,884,814 or JP-A 308577/1989 discloses to blend an ionomer resin in the form of an ethylene/(meth)acrylic acid copolymer having a certain spectrum of physical properties with a relatively soft ionomer resin in the form of an ethylene/(meth)acrylic acid/(meth)acrylate terpolymer. The soft/hard ionomer blend is used as a golf ball cover. JP-A 277208/1993 discloses a golf ball using a mixture of two or more metal salts of ethylene-unsaturated carboxylic acid-unsaturated carboxylate terpolymers having a low flexural modulus as the cover stock. These are very effective techniques for achieving significant improvements in productivity and cost while maintaining hitting feel and controllability comparable to the balata rubber.

The ionomer resin covers of these patents, however, still suffer from the problem that the ball surface is marred or fluffed by iron shots because the cover surface is scraped off by grooves across the iron clubface. Additionally, on account of low resilience, the ionomer resin covers invite a substantial drop of resilience when combined with solid cores.

Many attempts were made to use thermosetting polyurethane elastomers as a substitute for the balata rubber and ionomer resins because the polyurethane elastomers are relatively inexpensive and offer good feeling and good scuff resistance. See U.S. Pat. Nos. 3,989,568, 4,123,061, and 5,334,673. Despite improvements in the scuff resistance which is the drawback of softened ionomer resin blends, the thermosetting polyurethane elastomers require complex steps of introducing the raw material and then effecting curing reaction, indicating that further efforts must be made for mass-scale production.

Also, U.S. Pat. Nos. 3,395,109, 4,248,432 and 4,442,282 disclose thermoplastic polyurethane elastomers as the cover stock. They do not satisfy all the requirements of moldability, hitting feel, control, resilience, and scuff resistance upon iron shots.

In this regard, we proposed in JP-A 271538/1997 the use of high resilience thermoplastic polyurethane elastomers. A further improvement in scuff resistance upon iron shots is desired.

SUMMARY OF THE INVENTION

An object of the invention is to provide a solid golf ball which is efficiently moldable and meet such requirements as a pleasant feel, ease of control, initial velocity (resilience and flight distance), and scuff resistance upon iron shots.

The invention pertains to a solid golf ball comprising a solid core and a cover enclosing the core. According to the invention, the reaction product of a thermoplastic polyurethane elastomer with an isocyanate compound is used as a main component of a resin composition of which the cover is formed. This resin composition or cover stock is efficient to mold. The resulting solid golf ball meet such requirements as a pleasant feel, ease of control, resilience (initial velocity and flight distance), and scuff resistance upon iron shots.

More specifically, when a core is enclosed with a cover obtained by subjecting a thermoplastic polyurethane elastomer to crosslinking reaction with an isocyanate compound, the ball is significantly improved in scuff resistance upon iron shots. The ball offers a pleasant feel, ease of control, and resilience (initial velocity and flight distance). The crosslinking reaction is effected by adding such an amount of an isocyanate compound to a thermoplastic polyurethane elastomer that the thermoplastic polyurethane elastomer remains at a thermoplastic level sufficient to allow injection molding, heating and melting them for reaction to give a batchwise mix, and injection molding the mix. Alternatively, a dry blend of a thermoplastic polyurethane elastomer and an isocyanate compound is kneaded and reacted while it is injection molded.

In one preferred embodiment, the isocyanate compound is an aromatic isocyanate compound, or a blocked isocyanate compound, typically toluene diisocyanate having isocyanate radicals blocked, or a uretidione compound. Also preferably, the thermoplastic polyurethane elastomer is one made using an aliphatic diisocyanate.

Known in the prior art is a method for preparing a resin molding by causing a polyisocyanate compound to penetrate into a surface layer of polyurethane base resin molding (JP-A 47630/1994). A focus was also placed on polyurethane elastomers having properties comparable to those of thermosetting polyurethane elastomers. In JP-B 2063/1983, a molding is prepared by feeding a batchwise mixture of an isocyanate compound and a compound which is not reactive with isocyanate radicals into a molding machine along with a thermoplastic polyurethane elastomer.

When these prior art methods are applied to the cover of golf balls, the former method requires a prolonged time and a sophisticated technique and is thus impractical. The batchwise mixture of isocyanate compound used in the latter method, at its surface, is unstable in air at room temperature because the isocyanate compound has not been inactivated by chemical reaction. The batchwise mixture must be stored prior to use under conditions capable of avoiding reaction with moisture in air. Additionally, reaction of the batchwise mixture with a thermoplastic polyurethane elastomer is rapid and difficult to control. It is then difficult to produce molded parts of consistent quality on a mass scale. The use in the batchwise mixture of the compound which is not reactive with isocyanate radicals detracts from the physical properties required as the golf ball cover such as resilience and scuff resistance upon iron shots.

DETAILED DESCRIPTION OF THE INVENTION

In the solid golf ball of the invention, the cover is formed of a resin composition primarily comprising the reaction product between (1) a thermoplastic polyurethane elastomer and (2) an isocyanate compound.

The thermoplastic polyurethane elastomer (1) has a structure including soft segments of a high molecular weight polyol (or polymeric glycol) and hard segments constructed of a chain extender and a diisocyanate.

The high molecular weight polyol used as one source material may be any of those commonly used in the prior polyurethane elastomer art. Polyester and polyether polyols are generally included. Polyester polyols include polybutylene adipate, polyethylene butylene adipate, polyethylene adipate, polycaprolactone and blends thereof. One exemplary polyether polyol is polyoxytetramethylene glycol. These polyols preferably have an average molecular weight of about 1,000 to about 5,000.

The chain extender used herein may be any of those commonly used in the prior polyurethane elastomer art. Examples include 1,4-butylene glycol, 1,2-ethylene glycol, 1,3-butane diol, 1,6-hexane diol, 2,2-dimethyl-1,3-propane diol, 4,4'-diaminodiphenylmethane, hydrogenated MDA, isophorone diamine, hexamethylenediamine, and hydroquinone diethylol ether. The chain extenders preferably have an average molecular weight of about 200 to about 15,000.

The diisocyanate used herein may be any of those commonly used in the prior polyurethane elastomer art. Examples include aromatic diisocyanates such as 2,4-toluene diisocyanate, 2,6-toluene diisocyanate, mixtures thereof, 4,4'-diphenylmethane diisocyanate, m-phenylene diisocyanate, and 4,4'-biphenyl diisocyanate; aliphatic diisocyanates such as tetramethylene diisocyanate, hexamethylene diisocyanate (HDI), and octamethylene diisocyanate; and alicyclic diisocyanates such as xylene diisocyanate. Use of hexamethylene diisocyanate is preferable from the non-yellowing standpoint.

The thermoplastic polyurethane elastomer constructed from the foregoing components is commercially available, for example, under the trade name of Pandex T-1195, T-R3080, T-7295, and T-7298 from Dainippon Ink & Chemicals K.K.

In addition to the above-mentioned thermoplastic polyurethane elastomer, another polymer such as a thermoplastic elastomer may be further blended. There may be blended, for example, polyamide elastomers, polyester elastomers, ionomer resins, styrene block elastomers, hydrogenated polybutadiene, and ethylene-vinyl acetate (EVA) copolymers. Any of hard resins such as polycarbonates and polyacrylates may also be added and mixed. The amount of the other polymer blended is 0 to 100 parts, preferably 10 to 75 parts, more preferably 10 to 50 parts by weight, per 100 parts by weight of the thermoplastic polyurethane elastomer as the essential component. The amount of the other polymer blended may be adjusted as appropriate in accordance with the desired hardness adjustment, resilience improvement, flow improvement and adhesion to the solid core surface.

Component (2) is an isocyanate compound which may be any of isocyanate compounds commonly used in the prior polyurethane art. Illustrative examples of the isocyanate compound include aromatic isocyanates such as 2,4-toluene diisocyanate, 2,6-toluene diisocyanate, and mixtures thereof, 4,4'-diphenylmethane diisocyanate, m-phenylene diisocyanate, and 4,4'-biphenyl diisocyanate although the isocyanate compounds are not limited thereto.

Also included are aliphatic diisocyanates such as tetramethylene diisocyanate, hexamethylene diisocyanate (HDI), and octamethylene diisocyanate; and alicyclic diisocyanates such as xylene diisocyanate. Use of aromatic isocyanate compounds is preferable.

The isocyanate compounds which can be used herein further include blocked isocyanate compounds resulting from reaction of a compound having at least two isocyanate radicals at ends with an active hydrogen-bearing compound, and uretidione compounds resulting from dimerization of isocyanate. These are described in further detail.

With respect to the blocked isocyanate compounds, the compound having at least two isocyanate radicals at ends may be any of isocyanate compounds which are commonly used in the prior polyurethane art. Examples include aromatic diisocyanates such as 2,4-toluene diisocyanate, 2,6-toluene diisocyanate, mixtures thereof, 4,4'-diphenylmethane diisocyanate, m-phenylene diisocyanate, and 4,4'-biphenyl diisocyanate; aliphatic diisocyanates such as tetramethylene diisocyanate, hexamethylene diisocyanate (HDI), and octamethylene diisocyanate; alicyclic diisocyanates such as xylene diisocyanate; and triisocyanates such as 4,4',4"-triphenylmethane triisocyanate, 2,4,4'-biphenyl triisocyanate, and 2,4,4'-diphenylmethane triisocyanate. The isocyanate compound used herein is not particularly limited although use is preferably made of 2,4-toluene diisocyanate or 2,6-toluene diisocyanate or a mixture thereof.

The active hydrogen-bearing compound may be any of such compounds which are commonly used in the prior art as a blocking agent for isocyanate radicals. For example, alcohols, phenols, $\epsilon$-caprolactam, oximes, and active methylene compounds are useful. Of these, phenols, especially phenol and xylenol are effective.

In reacting the above-described two components to form the blocked isocyanate compound, well-known methods may be used. For a diisocyanate having isocyanate radicals with different reactivities such as 2,4-toluene diisocyanate, a procedure involving forming a half blocked intermediate, then converting it to a polyisocyanate prepolymer is preferably employed because the isocyanate radical with higher reactivity can be regenerated as the blocked isocyanate for use in crosslinking. One exemplary procedure involves adding dropwise 3 mol of 2-ethylhexanol to 3 mol of 2,4-toluene diisocyanate, holding the mixture at 50° C. for 2 hours to form a half blocked intermediate, adding 5 g of potassium octylate thereto for promoting isocyanation, adding 500 g of cellosolve acetate thereto, and holding the mixture at 105° C. for 2 hours, thereby blocking about 98% of the isocyanate radicals.

The resulting blocked isocyanate compound is stable at room temperature as a carbamic acid compound free of isocyanate radicals capable of liberating at room temperature, but when heated, allows isocyanate radicals to dissociate and thus becomes activated.

As the blocked isocyanate compound, commercially available products may be used, for example, blocked polyisocyanate Colonate AP Stable, Colonate 2503 and Colonate 2507 from Nippon Polyurethane Industry K.K.

The other useful isocyanate compounds are uretidione compounds resulting from dimerization of isocyanate. Isocyanate compounds having at least two isocyanate radicals are preferably aromatic isocyanates, for example, 2,4-toluene diisocyanate, 2,6-toluene diisocyanate, mixtures thereof, and 4,4'-diphenylmethane diisocyanate. Dimerization of TDI may be effected by heating in the presence of a catalyst such as a trialkylphosphine or dialkyl phosphine. The dimer thus obtained will dissociate into free TDI when heated at about 120° C. or higher, and be subject to allophanate crosslinking when heated along with an active hydrogen-bearing compound.

As the uretidione compound, commercially available products may be used, for example, Desmodur TT (TDI dimer) from Sumitomo-Bayer K.K.

The isocyanate compound (2) described above is preferably blended with the thermoplastic polyurethane elastomer (1) in such amounts that 0.1 to 10 parts, more preferably 0.2 to 5 parts, most preferably 0.3 to 3 parts of the isocyanate compound is present per 100 parts by weight of the thermoplastic polyurethane elastomer. On this basis, less than 0.1 part of the isocyanate compound would induce insufficient crosslinking reaction and little improvements in physical properties. More than 10 parts of the isocyanate compound would give the reaction product which experiences substantial yellowing with time, heat and ultraviolet radiation, and loses thermoplastic properties and resilience.

In the practice of the invention, the dissociation reaction rate and temperature of the isocyanate compound can be controlled by a catalyst. The catalyst used herein may be any of catalysts commonly used in urethane reaction, for example, tin compounds such as 1,3-diacetoxytetrabutyl-stannoxane, metal (excluding tin) salts of organic acids such as 2-ethylhexyl titanate, common inorganic metal salts such as stannic chloride, and tertiary amines such as N-methylmorpholine. The amount of the catalyst blended is preferably about 0.01 to 3 parts, more preferably about 0.05 to 1 parts by weight per 100 parts by weight of the thermoplastic polyurethane elastomer.

In the golf ball cover stock according to the invention, various other additives may be blended in addition to the above-described essential components. For example, pigments, dispersants, antioxidants, UV absorbers, and parting agents may be added in conventional amounts.

According to the invention, a solid core is enclosed in the above-described cover stock to form a golf ball. The solid core used herein is preferably formed of a rubber composition based on cis-1,4-polybutadiene to a specific gravity of 0.95 to 1.13, especially 0.97 to 1.10. With a core having a specific gravity in excess of 1.13, golf balls having a diameter of 42.67 to 42.9 mm would sometimes exceed the weight limit prescribed in the Rules of Golf. Additionally, such a core would be reduced in resilience owing to the specific gravity adjusting additive causing an energy loss upon impact, and as a result, the golf ball would not travel a satisfactory distance. With a core having a specific gravity of less than 0.95, golf balls having the above-described diameter would be far lighter than the weight limit prescribed in the Rules of Golf and be readily affected by the wind.

In the practice of the invention, the solid core may be either a single-layer core used in two-piece golf balls or a multiple solid core of multilayer structure including an outer layer surrounding an inner layer. Solid cores prepared from well-known compositions by well-known methods may be used.

The golf ball of the invention can be manufactured by well-known methods. Since the cover stock is thermoplastic, there may be used an injection molding method involving placing a preformed core in a mold and directly injecting the cover stock into the mold and a compression molding method involving preforming a pair of hemispherical half cups from the cover stock, and encasing a core in the pair of half cups, followed by heat compression molding at 140 to 180° C. for 2 to 10 minutes. The injection molding method is advantageous.

The injection molding is carried out in either of the following methods (1) and (2).

(1) An isocyanate compound is added to a thermoplastic polyurethane elastomer in such amounts that the thermoplastic polyurethane elastomer remains at a thermoplastic level. The mixture is heated and melted for reaction, obtaining a batchwise cover stock, which is then injection molded.

(2) A thermoplastic polyurethane elastomer and an isocyanate compound are dry blended. The dry blend is kneaded and reacted at the same time as it is injection molded.

Specifically in method (1), with respect to the amount of the isocyanate compound ensuring that the thermoplastic polyurethane elastomer remains at a thermoplastic level, the thermoplastic level corresponds to a flow of at least 0.1 g/10 min. as measured at 210° C./2160 g according to ASTM D1238. It is recommended that the heating temperature be 160 to 200° C., especially 170 to 190° C. and the reaction time be ½ to 10 minutes, especially 1 to 5 minutes.

In method (2), the dry blending may employ any of well-known techniques, for example, rotating, stationary and high-speed shear flow mixers.

In the invention, the thermoplastic polyurethane elastomer undergoes crosslinking reaction with isocyanate radicals of the isocyanate compound (e.g., isocyanate radicals liberated from the isocyanate compound as a result of decoupling of the blocking moiety or dissociation of a dimer, or isocyanate radicals of an aromatic isocyanate compound) during formation of a batchwise cover stock in method (1) or during injection molding in method (2). In this form of reaction or crosslinking, isocyanate radicals react with residual OH radicals on the thermoplastic polyurethane elastomer to form urethane bonds, or addition reaction takes place between urethane radicals and isocyanate radicals to form an allophanate or biuret form.

The golf ball cover thus formed preferably has a Shore D hardness of 35 to 65, more preferably 35 to 60, further preferably 38 to 58, and most preferably 40 to 56. A cover with a Shore D hardness of less than 35 would receive too much spin on short iron shots and be thus difficult to control. A cover with a Shore D hardness of more than 65 would receive least spin on iron shots and give an unpleasant feel when hit. The cover preferably has a thickness or gage in the range of 1 to 5 mm. The cover is not limited to a single layer and may be formed to a multi-layer structure. In the case of the multi-layer construction, the thickness of the entire cover should fall in the above-defined range.

The golf ball of the invention is formed to a diameter and weight as prescribed in the Rules of Golf, specifically a diameter of not less than 42.67 mm and a weight of not greater than 45.93 g. The golf ball constructed according to the invention preferably has a diameter of 42.67 to 42.9 mm. It is recommended that the ball undergo a deflection of 2.0 to 4.0 mm, preferably 2.2 to 4.0 mm, more preferably 2.6 to 3.5 mm, under an applied load of 100 kg.

There has been described a solid golf ball in which the cover is primarily formed of the reaction product between a thermoplastic polyurethane elastomer and an isocyanate compound. The cover is efficiently moldable while the solid golf ball meets such requirements as a pleasant feel, ease of control, high resilience, and scuff resistance upon iron shots. Using the methods of the invention, golf balls can be manufactured on a commercial mass scale.

EXAMPLE

Examples of the invention are given below by way of illustration and not by way of limitation. Parts are by weight.

Examples 1–9 & Comparative Examples 1–3

Solid cores A or B having a diameter of 38.5 mm for two-piece solid golf balls were prepared by kneading a core stock A or B of the following composition and molding and vulcanizing the stock at 155° C. for 20 minutes.

|  | Parts by weight |
|---|---|
| Core composition A | |
| Polybutadiene rubber | 100 |
| Zinc acrylate | 21.5 |
| Zinc oxide | 12 |
| Dicumyl peroxide | 1 |
| Core composition B | |
| Polybutadiene rubber | 100 |
| Zinc acrylate | 21.5 |
| Zinc oxide | 26.3 |
| Dicumyl peroxide | 1 |

The polybutadiene rubber used was commercially available BR01 by Nippon Synthetic Rubber K.K.

The cores A and B were measured for specific gravity, hardness and initial velocity. The hardness of a core was expressed by a deflection (mm) of the core measured under an applied load of 100 kg, with greater values indicating softer cores. The initial velocity of a core was measured according to the method prescribed by USGA or R&A. The results shown in Table 1.

TABLE 1

|  | Core A | Core B |
|---|---|---|
| Specific gravity | 1.07 | 1.16 |
| Hardness (mm) | 3.41 | 3.41 |
| Initial velocity (m/s) | 78.12 | 77.28 |

Components of the formulation shown in Table 2 were kneaded in a twin-screw extruder at a temperature of 190° C., obtaining cover compositions.

TABLE 2

| Cover No. | 1 | 2 | 3 | 4 |
|---|---|---|---|---|
| Pandex T7298 | 100.5 | 100 | 100 | 100 |
| Millionate MT | — | 0.5 | 1.0 | 1.5 |
| Titanium oxide | 3 | 3 | 3 | 3 |
| Polyethylene wax | 0.5 | 0.5 | 0.5 | 0.5 |

Pandex T7298: non-yellowing thermoplastic polyurethane elastomer of aliphatic isocyanate, surface hardness 98 on JIS A scale, 48 in Shore D, by Dainippon Ink & Chemicals K.K. Millionate MT: methylene di-para-phenylene isocyanate (MDI), solidifying point ≧38° C., purity ≧99.5%, by Nippon Polyurethane Industry K.K.

Components of the formulation shown in Table 3 were kneaded in a twin-screw extruder, obtaining cover compositions. A polyurethane elastomer/blocked isocyanate compound system was kneaded under a set of conditions A. An ionomer resin was kneaded under a set of conditions B. A dry blend system was kneaded under a set of conditions C.

Kneading condition A

To complete crosslinking reaction during kneading, kneading was carried out at a temperature allowing the blocking agent to dissociate from the blocked isocyanate compound and for an extended residence time through the extruder, that is, at a kneading temperature of 190° C. and a discharge rate of 5 kg/hr.

Kneading condition B

Kneading was carried out at a kneading temperature of 190° C. and a discharge rate of 10 kg/hr. as commonly employed for kneading of ionomer resins.

Kneading condition C

The resin and a coloring agent were kneaded under the set of conditions B and pelletized. The isocyanate compound was dry blended therewith and thoroughly mixed in a rotating mixer.

TABLE 3

| Cover No. | 1 | 5 | 6 | 7 | 8 | 9 | 10 | 11 | 12 |
|---|---|---|---|---|---|---|---|---|---|
| Pandex T7298 | 100 | 100 | 100 | 100 | 100 | 100 | 100 | — | — |
| Surlyn 8120 | — | — | — | — | — | — | — | 50 | 50 |
| Himilan 1706 | — | — | — | — | — | — | — | — | 25 |
| Himilan AM7316 | — | — | — | — | — | — | — | 50 | 25 |
| Colonate AP Stable | — | 0.5 | 1.0 | 2.0 | — | — | — | — | — |
| Desmodur TT | — | — | — | — | 0.3 | 1.5 | 1.5 | — | — |
| Titanium oxide | 3 | 3 | 3 | 3 | 3 | 3 | 3 | 3 | 3 |
| Polyethylene wax | 0.5 | 0.5 | 0.5 | 0.5 | 0.5 | 0.5 | 0.5 | 0.5 | 0.5 |
| Kneading condition | A | A | A | A | A | A | C | B | B |

Pandex T7298: non-yellowing thermoplastic polyurethane elastomer of aliphatic isocyanate, surface hardness 98 on JIS A scale, 48 in Shore D, by Dainippon Ink & Chemicals K.K.
Surlyn 8120: ethylene-methacrylic acid-acrylate terpolymer ionomer, acid content ~10 wt %, ion species Na, ester content ~20 wt %, surface hardness 45 in Shore D, by E. I. duPont Himilan 1706: ethylene-methacrylic acid copolymer ionomer, acid content ~15 wt %, ion species Zn, ionization degree ~60 mol %, surface hardness 62 in Shore D, by Mitsui-duPont Polychemical K.K.
Himilan AM7316: ethylene-methacrylic acid-acrylate terpolymer ionomer, ion species Zn, surface hardness 40 in Shore D, by Mitsui-duPont Polychemical K.K.
Colonate AP Stable: blocked isocyanate, effective NCO content 12 wt %, isocyanate species TDI, dissociation conditions 180° C./30 min., by Nippon Polyurethane Industry K.K.
Desmodur TT: TDI dimer, effective NCOG content 24–24.6 wt %, isocyanate species TDI, by Sumitomo-Bayer K.K.

After each of solid cores A and B was placed in an injection mold, each of the cover compositions was injected into the mold, forming a solid golf ball having a cover of 2.1 mm thick.

The golf balls thus obtained were examined for various properties by the following tests. The results are shown in Tables 4 and 5. The hardness and initial velocity of the balls were measured as were the cores.

Flight test

Using a swing robot equipped with No. 1 wood or driver, the ball was hit at a head speed of 45 m/s (HS45). A carry and a total distance were measured.

Hitting feel

A panel of five professional golfers and five top amateur golfers carried out an actual hitting test using No. 1 wood or driver. The balls were rated "Exc." when the feel was very good and "Good" when the feel was good.

Control

A panel of five professional golfers and five top amateur golfers carried out an actual hitting test using an iron. The balls were rated "Exc." when the control was very easy and "Good" when the control was relatively easy.

Scuff resistance upon iron shots

The ball was conditioned at 23° C. Using a swing robot machine having a pitching wedge mounted, the ball was hit three times (at three positions) at a head speed of 37 m/s. The surface state of the ball at the hit positions was rated on a 5-point scale.

5: ball surface intact, or very slight clubface dents
4: some clubface dents, but no fluff on the cover surface
3: fluffy cover surface, noticeable scrapes
2: fluffy cover surface, cracks
1: dimples scraped off

TABLE 4

| | | Example | | | | | | | | |
|---|---|---|---|---|---|---|---|---|---|---|
| | | 1 | 2 | 3 | 4 | 5 | 6 | 7 | 8 | 9 |
| Cover No. | | 2 | 3 | 4 | 5 | 6 | 7 | 8 | 9 | 10 |
| Cover resin properties | Hardness (Shore D) | 48 | 48 | 48 | 48 | 48 | 49 | 49 | 49 | 49 |
| | Specific gravity | 1.18 | 1.18 | 1.18 | 1.18 | 1.18 | 1.18 | 1.18 | 1.18 | 1.18 |
| Core type | | A | A | A | A | A | A | A | A | A |
| Ball properties | Diameter (mm) | 42.7 | 42.7 | 42.7 | 42.7 | 42.7 | 42.7 | 42.7 | 42.7 | 42.7 |
| | Weight (g) | 45.2 | 45.2 | 45.2 | 45.2 | 45.2 | 45.2 | 45.2 | 45.2 | 45.2 |
| | Hardness (mm) | 3.1 | 3.1 | 3.1 | 3.1 | 3.1 | 3.0 | 3.0 | 2.9 | 2.9 |
| | Initial velocity (m/s) | 77.08 | 77.05 | 77.00 | 77.08 | 77.05 | 77.05 | 77.06 | 77.03 | 77.03 |
| Flight test (HS45) | Carry (m) | 215.0 | 215.2 | 215.0 | 215.0 | 215.2 | 215.0 | 215.2 | 215.0 | 215.0 |
| | Total (m) | 226.0 | 226.0 | 226.0 | 226.0 | 225.0 | 225.5 | 226.0 | 226.5 | 226.5 |
| Feel | | Exc. | Exc. | Exc. | Exc. | Exc. | Exc. | Exc. | Exc. | Exc. |
| Control | | Exc. | Exc. | Exc. | Exc. | Exc. | Exc. | Exc. | Exc. | Exc. |
| Scuff resistance (point) | | 5 | 5 | 5 | 5 | 5 | 5 | 5 | 5 | 5 |

TABLE 5

| | | Comparative Example | | |
|---|---|---|---|---|
| | | 1 | 2 | 3 |
| Cover No. | | 1 | 11 | 12 |
| Cover resin properties | Hardness (Shore D) | 48 | 42 | 48 |
| | Specific gravity | 1.18 | 0.97 | 0.97 |
| Core type | | A | B | B |
| Ball properties | Diameter (mm) | 42.7 | 42.7 | 42.7 |
| | Weight (g) | 45.2 | 45.2 | 45.2 |
| | Hardness (mm) | 3.1 | 3.2 | 3.1 |
| | Initial velocity (m/s) | 77.05 | 76.60 | 76.70 |
| Flight test (HS45) | Carry (m) | 215.0 | 212.2 | 213.6 |
| | Total (m) | 225.0 | 222.0 | 222.9 |

TABLE 5-continued

| | Comparative Example | | |
|---|---|---|---|
| | 1 | 2 | 3 |
| Feel | Exc. | Exc. | Exc. |
| Control | Exc. | Exc. | Exc. |
| Scuff resistance (point) | 3 | 2 | 2 |

As is evident from Tables 4 and 5, the golf balls within the scope of the invention are easy to mold and show superior results for all of feel, control, initial velocity indicating resilience, and flight performance. The balls also show excellent scuff resistance upon iron shots.

In contrast, the golf balls of Comparative Examples in which the covers are not of the inventive cover stock are not satisfactory in all of feel, control, initial velocity (or resilience), and cuff resistance upon iron shots.

Japanese Patent Application No. 364154/1997 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A solid golf ball comprising a solid core and a cover enclosing the core, said cover being formed of a resin composition primarily comprising the reaction product of a thermoplastic polyurethane elastomer with an isocyanate compound.

2. The solid golf ball of claim 1 wherein said isocyanate compound is an aromatic isocyanate compound.

3. The solid golf ball of claim 1 wherein said isocyanate compound is a blocked isocyanate compound.

4. The solid golf ball of claim 3 wherein said blocked isocyanate compound is toluene diisocyanate having isocyanate radicals blocked.

5. The solid golf ball of claim 1 wherein said isocyanate compound is a uretidione compound.

6. The solid golf ball of claim 1 wherein said thermoplastic polyurethane elastomer has been prepared using an aliphatic diisocyanate.

7. A method for preparing a solid golf ball, comprising the steps of:

placing a solid core in a golf ball mold, and injection molding a cover stock around the surface of said solid core, the molding step including adding an isocyanate compound to a thermoplastic polyurethane elastomer in such amounts that the thermoplastic polyurethane elastomer remains at a thermoplastic level sufficient to allow injection molding, heating and melting them for reaction to form an elastomer, and injecting the cover stock based on the elastomer.

8. A method for preparing a solid golf ball, comprising the steps of:

placing a solid core in a golf ball mold, and injection molding a cover stock around the surface of said solid core, said cover stock primarily comprising a dry blend of a thermoplastic polyurethane elastomer and an isocyanate compound whereby the dry blend is kneaded and reacted while it is injection molded.

* * * * *